United States Patent [19]
Baessler et al.

[11] 3,760,796
[45] Sept. 25, 1973

[54] METHOD AND APPARATUS FOR AUTOMATIC ANALYSIS OF BRAIN WAVE SIGNALS

[75] Inventors: Lee R. Baessler, Manhattan Beach; Lech Pisarski; Harvey F. Glassner, both of Los Angeles, all of Calif.

[73] Assignee: Humetrics Corporation, Los Angeles, Calif.

[22] Filed: Sept. 29, 1971

[21] Appl. No.: 184,825

[52] U.S. Cl. ............................................ 128/2.1 B
[51] Int. Cl. ............................................ A61b 5/00
[58] Field of Search ................. 128/2.05 T, 2.06 A, 128/2.06 F, 2.1 B, 2.1 R; 328/136, 140

[56] References Cited
UNITED STATES PATENTS
3,185,925   5/1965   Grass............................... 128/2.1 B
3,548,812   12/1970   Paine et al. ....................... 128/2.1 B
3,552,386   1/1971   Horth............................. 128/2.06 A
2,902,030   9/1959   Kennedy et al. ................. 128/2.1 B
3,138,759   6/1964   Thompson ...................... 328/140 X

*Primary Examiner*—William E. Kamm
*Attorney*—L. Lawton

[57] ABSTRACT

A method and apparatus for the automatic analysis of the electroencephalogram waveform through the evaluation of the waves of the EEG waveform which occur within the frequency range from 3.5 Hz. to 7.0 Hz. within a predetermined time interval, e.g. 10 seconds. A linear ramp signal is generated for the time periods between zero crossovers of the EEG signal which represent a frequency within the 3.5 to 7 Hz. range. The cumulative amplitude that the ramp attains during the predetermined time interval is compared with a predetermined value to indicate a characteristic of the EEG waveform.

22 Claims, 5 Drawing Figures

INVENTORS
LEE R. BAESSLER
HARVEY F. GLASSNER
LECH PISARSKI

BY *Burns, Doane, Swecker & Mathis*

ATTORNEYS

METHOD AND APPARATUS FOR AUTOMATIC ANALYSIS OF BRAIN WAVE SIGNALS

BACKGROUND OF THE INVENTION

The subject invention relates to a method and apparatus for the automatic analysis of the electroencephalogram (EEG) waveform.

As is well known, the human brain generates electrical signals which reflect to a great extent the functional status of the brain and abnormal changes within the structure of the brain tissue will often produce significant signal changes such as spike discharges and low frequency waves. Unlike most other physiological signals such as the electrocardiogram (EKG), respiratory waves and the like, the electrical activity signal of the brain is both non-repetitive and of an extremely low voltage. The interpretation of the EEG signal is complex and requires the expertise of a qualified neurologist due to the arhythmic and widely varying character of the wave.

The difficulties and expense of obtaining the services of a qualified neurologist for the interpretation of the EEG waveform has effectively prevented the extensive use of the EEG waveform in the routine examination of patients by a general practitioner or internist. The analysis of the EEG waveform is, however, of great value in defining neurological problems and attempts have been made to provide a method and apparatus for the analysis of the EEG waveform.

It is known, for example, to record the electrical activity of the brain on a multiple pen recorder where each pen records the electrical activity from a different section of the brain. Such a system is illustrated, for example, in the U. S. Pat. No. 3,195,533 to Fisher. Others, such as Riehl et al in the U. S. Pat. No. 3,413,546 assigned to the assignee of the present invention, have evaluated the EEG waveform through the automatic analysis of the ratio between the frequency of the waveform to the voltage amplitude thereof such systems have not proven acceptable to the entire medical community.

It is accordingly an object of the present invention to provide a novel method and apparatus for the automatic analysis of EEG waveforms, and further to provide such analysis through the evaluation of the frequency thereof within a certain specified frequency range.

It is another object of the present invention to provide a novel method and apparatus for analyzing the EEG signal directly from the patient's head with an immediate display indicating which specific area of the brain may be suspect.

It is still another object of the present invention to provide a novel method and apparatus adapted for extensive use in the routine examination of patients and which does not require the services of a qualified neurologist.

It is yet another object of the present invention to provide a novel method and apparatus for monitoring the non-repetitive and extremely low voltage of the complex EEG signal which is both accurate and automatic.

These and other objects and advantages of the present invention will be readily apparent to one skilled in the art to which the invention pertains from the claims and from the following detailed description of a preferred embodiment when read in conjunction with the appended drawings.

THE DRAWINGS

FIG. 1 is a functional block diagram of the apparatus of the present invention;

FIGS. 2(A) through 2(H) are graphs of illustrative waveforms appearing in the apparatus of the present invention;

THE DETAILED DESCRIPTION

Figure 1:
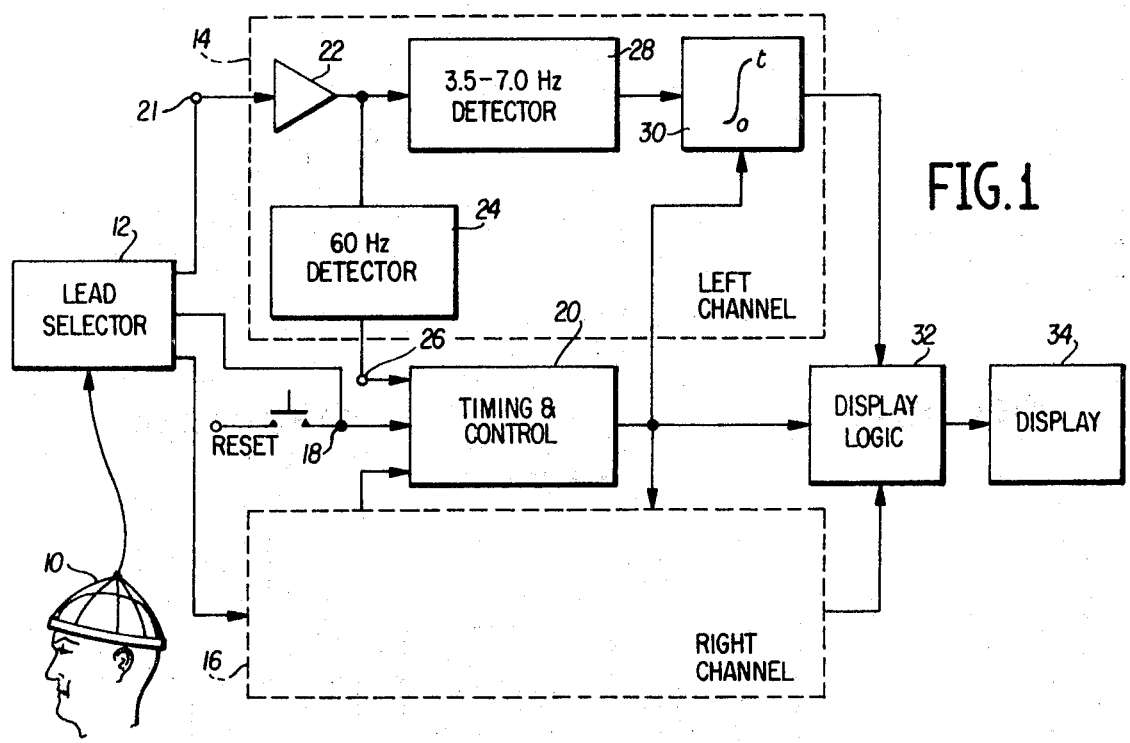

With reference now to FIG. 1, the electrical activity of the brain may be sensed by one or more sets of electrodes of the needle or cup type conventionally located on the head of the patient by a helmet 10. The signals from the electrode helmet 10 may be applied through a lead selector switch 12 to a left channel signal processor 14 and a right channel signal processor 16. A signal is also derived from the lead selector 12 for application to terminal 18 of a timing and control circuit 20 subsequently to be described.

The left channel signal processor 14 includes a high gain amplifier 22 having a pass band from 3.0 Hz. to 45 Hz. and a gain of approximately 250,000. The gain of the amplifier 22 is reduced rapidly for frequencies above 45 Hz. to reduce the effects of line voltage or 60 Hz. interference. An excess of line voltage interference may be detected by the application of the output signal from the amplifier 22 through a 60 Hz. detector 24 to an input terminal 26 of the timing and control circuit 20 subsequently described in more detail in connection with FIGS. 3 and 4.

The output signal from the amplifier 22 is also applied to a 3.5 Hz. to 7.0 Hz. detector which produces an output pulse variable in width in an inverse relationship to the frequency of the signal applied to the detector 28 within the specified frequency range. In the event that the output signal from the amplifier 22 is either below 3.5 Hz. or above 7.0 Hz. the detector 28 will provide no output signal to the resettable integrator 30 to which the detector 28 is connected. The integrator 30 is reset, as will be explained, by the timing and control circuit 20 and the output signal from the integrator 30 is applied through a display logic circuit 32 to a suitable conventional display 34.

The right channel signal processor 16 may be identical in every respect to the left channel signal processor 14 described above and therefore need not be additionally discussed.

Figure 2:
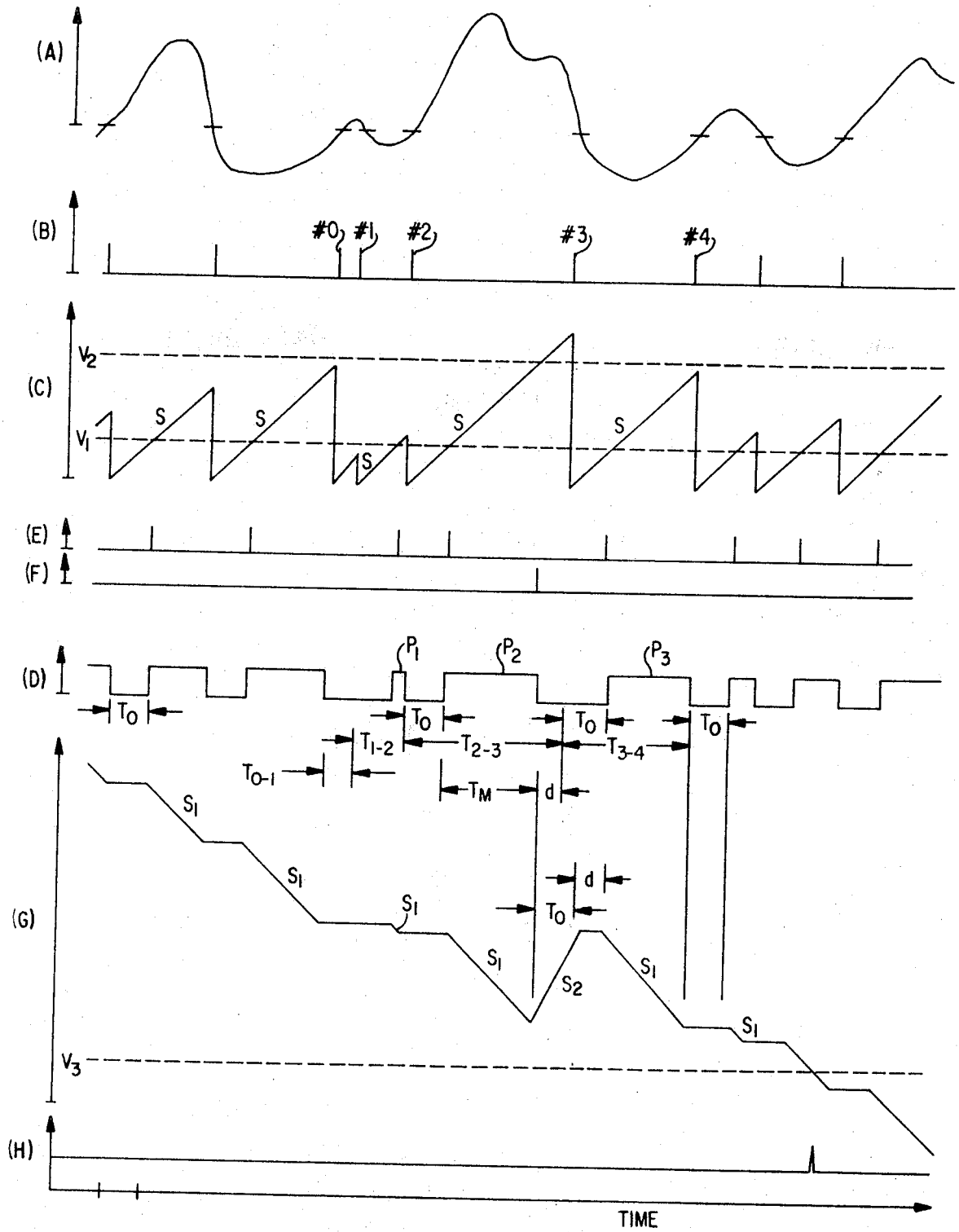

The operation of the circuit of FIG. 1 may more easily be understood with reference to the waveforms illustrated in FIG. 2. With reference now to FIGS. 1 and 2, the output signal from the electrodes 10 as applied to the lead selector 12 may for example take the form illustrated in waveform A of FIG 2. This signal as amplified in the amplifier 22 retains the same shape.

The 3.5 Hz. to 7.0 Hz. detector 28 of FIG. 1 may contain a conventional zero crossing detector which provides a series of pulses indicated in waveform B of FIG. 2. These pulses may be used to reset a positive going ramp voltage to a predetermined value to thereby produce the sawtooth waveform in which the slope S of all of the individual teeth is a constant and in which the amplitude of each tooth is a function of the spacing between adjacent pulses in waveform B. This sawtooth waveform is illustrated in FIG. 2 as waveform C and is utilized to terminate the individual pulses illustrated in waveform D.

The sawtooth signal illustrated in waveform C is also utilized to generate a series of pulses upon the coincidence of each tooth thereof with a predetermined reference voltage $V_1$. These pulses are illustrated as waveform E in FIG. 2 and are utilized to initiate the individual pulses of the waveform D. Thus each pulse of waveform D is initiated by a pulse in waveform E and terminated by the next pulse in waveform B which also marks the termination of the individual teeth in the sawtooth waveform C.

Since the slope S of the waveform C is a constant, and since the voltage level $V_1$ is also a constant, the duration of the reset portion $T_0$ for each individual pulse in waveform D is a constant. The duration of the individual pulses $P_1$, $P_2$, $P_3$, etc. in the waveform D are, however, variable inasmuch as each individual pulse is initiated by a pulse in waveform E a predetermined time after the initiation of the voltage ramp of waveform C and terminated upon the resetting thereof by a pulse in waveform B. The time interval $T_{1-2}$ between the pulses No. 1 and No. 2 in waveform B is thus the time interval $T_0$ plus the width of the pulse $P_1$. Similarly, the time interval $T_{3-4}$ between pulses 3 and 4 in waveform D is thus the reset time interval $T_0$ plus the width of the pulse $P_3$.

The individual teeth in the sawtooth waveform C of FIG. 2 are additionally compared with a second predetermined voltage reference $V_2$. As indicated in the tooth initiated by pulse 2 in waveform B, the attainment of the voltage level $V_2$ by waveform C generates a pulse illustrated in waveform F. The pulse in waveform F is utilized to terminate the the pulse $P_2$ in waveform D in advance of the generation of pulse No. 3 in waveform B. This effectively limits the width of the pulses in waveform D to a pdredetermined fixed value determined by the slope S of the teeth of waveform C and the value of the voltage reference $V_2$.

The individual pulses in waveform D of FIG. 2 are applied to the integrator 30 of FIG. 1 to produce the waveform G of FIG. 2. Since the amplitude of the individual pulses $P_1$, $P_2$, $P_3$, etc. of waveform C is a constant, the slope S of the integrator 30 output signal illustrated in waveform G is also a constant. The value of the output signal from the integrator 30 remains unchanged in the absence of a pulse in the waveform D, i.e. during the time intervals $T_0$.

The energy in the waveform D is thus integrated to produce the signal illustrated in waveform g. As eariler indicated, the width of the pulses of waveform D are limited to a maximum period $T_m$. A pulse such as that illustrated as pulse $P_2$ in waveform D indicates that the frequency of the input pulses is less than 3.5 Hz. Since the effect of this pulse is not desired, the early termination of a pulse in waveform D reverses the polarity of the signal applied to the integrator for a period $T_0$ which is one half that of the period $T_m$. The slope $S_2$ of the reversal is selected to be twice that of the slope $S_1$ so that the effects of an excessively long pulse such as the pulse $P_2$ are eliminated from the output signal from the integrator 30 of FIG. 1.

Since the period $T_0$ of the current reversal begins by a time period d prior to the next reset of the sawtooth waveform C, the current reversal period always terminates a time period d ahead of the next pulse in waveform D. Thus, while the spacing between pulses in waveform D varies the signal illustrated in waveform G is not effected by the current reversal.

Input signals to the detector 28 of FIG. 1 likewise do not effect the output signal of the integrator 30 for the pulses of waveform B which effect a resetting of the sawtooth waveform C of FIG. 2 prior to attainment of the voltage level $V_1$. Note, for example, that no pulse in waveform D is generated during the time period between pulses No. 0 and No. 1 of waveform B thus indicating that the frequency or pulse recurrence rate of the pulses No. 0 and No. 1 is too high, i.e. above 7.0 Hz.

The timing and control circuit 20 of FIG. 1 limits the evaluation period of the output signal from the integrator 30 to a predetermined period, e.g. 10 seconds. If the value of the signal illustrated in FIG. 2 as waveform G attains a reference voltage level $V_3$ within this time interval, a pulse is generated by the display logic circuit 32 as indicated in waveform H and this pulse may be utilized to operate a suitable conventional indicator in the display 34 of FIG. 1.

Figure 3:
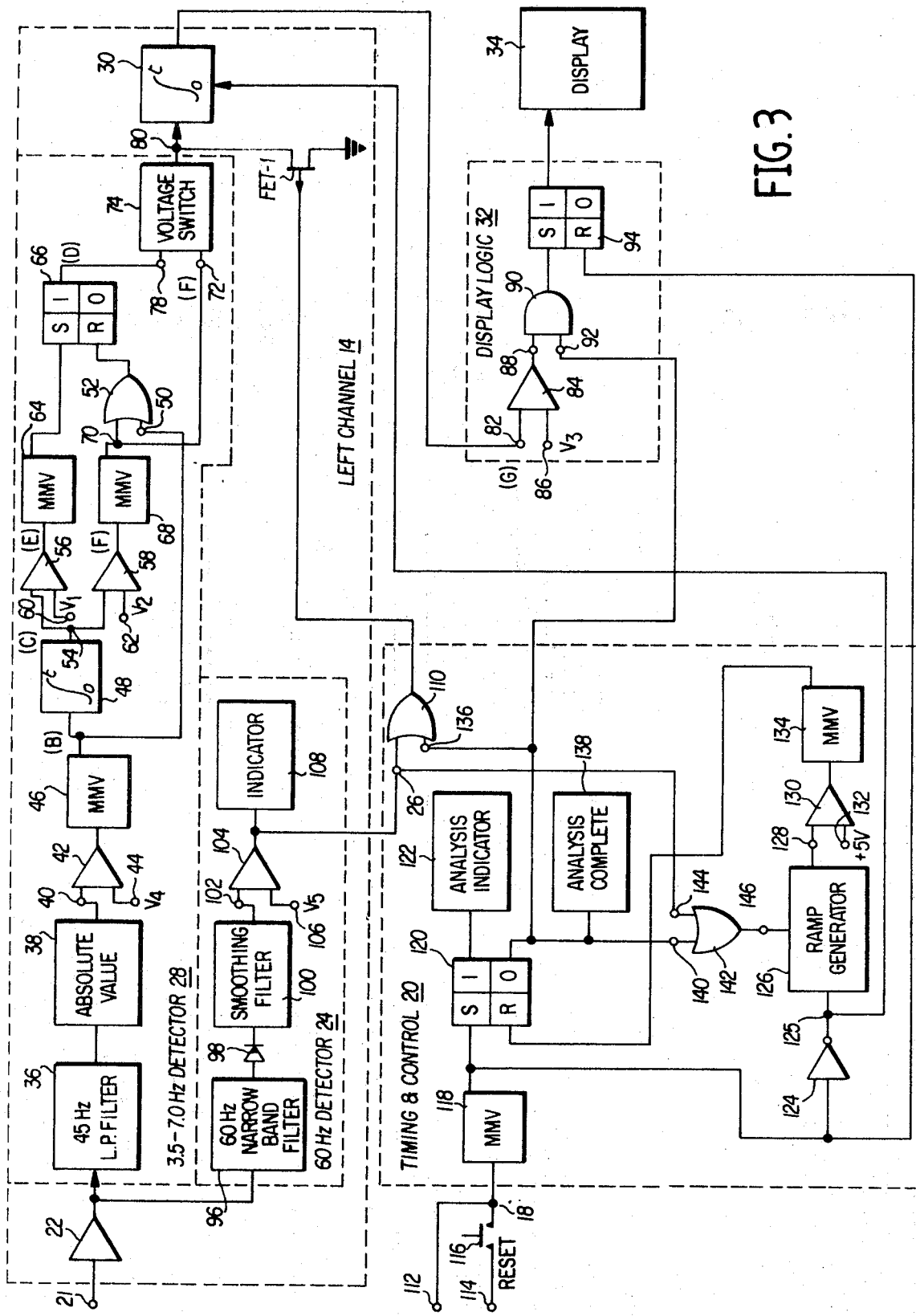
FIG. 3 is a more detailed functional block diagram of the apparatus of FIG. 1.

With reference now to the more detailed functional block diagram of FIG. 3, the output signals from the lead selector 12 of FIG. 1 are applied by way of an input terminal 21 to the high gain amplifier 22 as earlier described. The output signal from the amplifier 22 is fed through a suitable conventional 45 Hz. low pass filter 36 to an absolute value circuit 38. The output signal from the absolute value circuit 36 is applied to one input terminal 40 of a conventional threshold detector 42 to which a predetermined voltage reference $V_4$ is applied to the reference input terminal 44 thereof. The output signal from the threshold detector 42 is applied to the trigger input terminal of a conventional monostable or a one-shot multivibrator 46 and the output signal taken from the true output terminal thereof is applied to an integrator 48 and to one input terminal 50 of a two input terminal OR gate 52.

The output signal from the integrator 48 is applied to a common input terminal 54 of two comparators or threshold detectors 56 and 58. The voltage references $V_1$ and $V_2$ applied respectively to the other input terminals 60 and 62 of the detectors 56 qnd 58 correspond to the voltage reference levels illustrated in waveforms C or FIG. 2. The output signal from the detector 56 is applied to the trigger input terminal of a conventional monostable or one-shot multivibrator 64 and the output signal taken from the true output terminal thereof is applied to the set input terminal S of a conventional bistable multivibrator or flip-flop 66. The output signal from the detector 58 is similarly applied to the trigger input terminal of a conventional monostable or one-shot nultivibrator 68 and the output signal taken from the true output terminal thereof is applied to the other input terminal 70 of the OR gate 52 and to one input terminal 72 of a voltage switch 74 subsequently to be described in more detail in connection with FIG. 4.

The output signal from the OR gate 52 is applied to the reset input terminal R of the flip-flop 66 and the output signal taken from the true output terminal of the flip-flop 66 is applied to the other input terminal 78 of the voltage switch 74. The output signal from the voltage switch 74 is the output signal from the left channel signal processor 14 and is applied to an input terminal 80 of the resettable integrator 30 of FIG. 1.

With continued reference to FIG. 3, the output signal from the integrator 30 is applied to one input terminal 32 of a conventional comparator or threshold detector 84 to which a predetermined reference voltage $V_3$ is applied to the reference input terminal 86 thereof. The voltage reference $V_3$ corresponds to that indicated on waveform G of FIG. 2 and the output signal from the detector 84 is applied to one input terminal 88 of a two input terminal AND gate 90 which receives, at the other input terminal 92 thereof an output signal from the timing and control circuit 20 as will hereinafter be described. The output signal from the AND gate 90 is applied to the set input terminal S of a conventional bistable multivibrator or flip-flop 94 and the output signal taken from the true output terminal thereof is applied to the display 34 of FIG. 1.

With continued reference to FIG. 3, the output signal of the high gain amplifier 22 at the input of the left channel signal processor 14 is also applied to the 60 Hz. detector 24 of FIG. 1. This signal is applied through a conventional 60 Hz. narrow band filter 96, a diode 98 and a smoothing filter 100 connected in series to one input terminal 102 of a conventional comparator or threshold detector 104 to which a predetermined voltage reference $V_5$ is applied to the other input terminal 106 thereof. The output signal from the detector 104 is applied both to an indicator 108 of the 60 Hz. detector 104 and also to an input terminal 26 of a two input terminal OR gate 110 within the timing and control circuit 20.

Again with reference to FIG. 3, the output signal from the lead selector 12 of FIG. 1 is also applied by way of an input terminal 112 to the terminal 18 of the timing and control circuit 20. Also connected to the input terminal 18 of the timing and control circuit 20 is a conventional source of power (not shown) which may be selectively connected thereto from an input terminal 114 by way of the normally open contacts of a manually actuable reset switch 116.

The signal applied to the input terminal 18 is applied to the trigger input terminal of a conventional monostable or a one-shot multivibrator 118 and the output signal taken from the true output terminal thereof is applied to the reset input terminal R of the flip-flop 94 of the display logic 32. The output signal taken from the true output terminal of the multivibrator 118 is applied to the set input terminal S of a conventional bistable multivibrator or flip-flop 120 and the output signal taken from the true output terminal thereof is applied to a suitable conventional analysis indicator 122.

The output signal from the multivibrator 118 is also applied through an inverter 124 to the reset input terminal of the resettable integrator 30 and to a ramp generator 126 subsequently to be described in more detail in connection with FIG. 5.

The output signal from the timing network 126 is applied to one input terminal 128 of a suitable conventional comparator or threshold detector 130 to which a positive 5 volt potential is applied to the reference input terminal 132 thereof. The output signal from the detector 130 is applied to the trigger input terminal of a conventional monostable or one-shot multivibrator 134 and the output signal taken from the true output terminal thereof is applied to the reset input terminal R of the flip-flop 120.

The output signal from the false output terminal of the flip-flop 120 is applied to the other input terminal 136 of the OR gate 110 within the timing and control circuit 20, to the input terminal 92 of the AND gate 90 within the display logic circuit 32, and to a suitable conventional analysis complete indicator 138. The output signal from the false output terminal of the flip-flop 120 is also applied to one input terminl 140 of an OR gate 142. The other input terminal 144 of the OR gate 142 is directly connected to the input terminal 26 of the timing and control circuit 20 receives the output signal from the 60 Hz. detector 24. The output signal from the OR gate 142 is applied by way of an output terminal 146 to the ramp generator 126 illustrated in FIG. 5.

In operation, the output signal from the lead selector 12 of FIG. 1 is amplified in the amplifier 22 and applied to the 3.5-7.0 Hz. detector 28. Substantially all of the frequency components above 45 Hz. are eliminated in the 45 Hz. low pass filter 36 and the absolute value of the low frequency signal is compared with a predetermined reference $V_4$ in the detector 42. When the voltage reference $V_4$ is exceeded by the amplitude of the input signal to the detector 42, the multivibrator 46 will be triggered to provide the pulses illustrated in waveform B OF FIG. 2. These pulses are utilized to reset the integrator 48 which provides the sawtooth waveform illustrated as waveform C in FIG. 2. The amplitude of the sawtooth waveform C is compared with the two voltage references $V_1$ and $V_2$ earlier described in connection with FIG. 2 to generate respectively the pulses illustrated in waveforms E and F of FIG. 2.

The binary element or flip-flop 66 is thus set by each pulse in waveform E as shaped by the multivibrator 64, and the flip-flop 66 is subsequently reset either by a pulse in the waveform F as shaped by the multivibrator 68 or by the application of the pulses in waveform B by way of the OR gate 52. The flip-flop 66 is thus reset upon the occurrence of each pulse in waveform B and additionally by a pulse in waveform F which indicates that the frequency of the applied signal is below 3.5 Hz.

Figure 4:
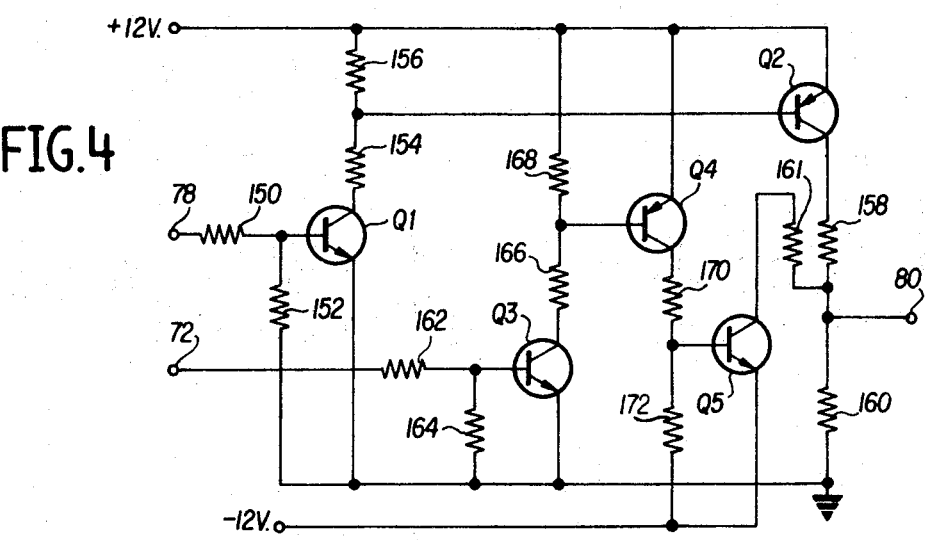
FIG. 4 is a schematic circuit diagram of the voltage switch illustrated in FIG. 3.

The output signal from the flip-flop 66 is thus a series of variable width pulses as illustrated in waveform D of FIG. 2. This signal is applied to the voltage switch 74 which, as hereinafter explained in greater detail in connection with FIG. 4, provides in response thereto a positive 2 volt input signal to the integrator 30. The output signal from the multivibrator 68 is also applied to the other input terminal 72 of the voltage switch 74 and provides, as is hereinafter explained, a negative 4 volt potential at the input terminal 80 of the integrator 30. The output signal of the 3.5-7.0 Hz. detector 20 thus has a positive 2 volt potential which provides the negative going ramp voltage illustrated in waveform G having a slope $S_1$, or a negative 4 volt potential which results in the positive going ramp signal illustrated in waveform G having a slope $S_2$.

As indicated in waveform G of FIG. 2, the output signal of the integrator 30 is unchanged in the absense of a signal on the input terminal 80 thereof. This is accomplished in the preferred embodiment illustrated by the shunting of the output signal of the voltage switch 74 to ground through a field effect transitor FET-1 in response to a signal from the timing and control circuit 20 which indicates either that 60 Hz. interference has been detected or that the analysis has been completed.

With continued reference to FIG. 3, the output signal from the amplifier 22 is applied to the 60 Hz. detector 24 wherein the 60 Hz. components are separated therefrom in the 60 Hz. narrow band filter. These frequency components are rectified in the diode 98 and applied to a smoothing filter 100 to produce an analog d.c. potential which is compared with the predetermined reference $V_5$ in the detector 104. When the voltage reference $V_5$ is exceeded, the indicator 108 provides an indication thereof and the output from the detector 104 is fed through the OR gate 110 of the timing and control circuit 20 to effect saturation of the transitor FET-1 thereby removing the input signal from the terminal 80 of the integrator 30.

When the lead selector 12 of FIG. 1 provides an indication on the input terminal 18 of the timing and control circuit 20, the multivibrator 118 of FIG. 3 is triggered to set the flip-flop 120 to provide a high signal level to the analysis indicator 122 to indicate that the analysis is in progress. The multivibrator 118 signal applies to reset signal to the flip-flop 94 of the display logic 32 thereby enabling the operation of the display 34 and, when inverted, also resets the integrator 30 so that the generation of the waveform G of FIG. 2 will begin from a predetermined potential.

The multivibrator 118 signal also initiates the generation of a ramp voltage within the timing network 126 which, when its exceeds the positive 5 volt reference on the detector 130, triggers the multivibrator 134 to reset the flip-flop 120. This removes the indication by the analysis indicator that analysis is in progress, and applies a signal to the analysis complete indicator 138. This analysis complete signal is also applied to the OR gate 142 to automatically reset the timing network 126. The timing network 126 may also be inhibited by the signal from the 60 Hz. detector 124 as applied through the OR gate 142.

The manual actuation of the reset switch 116 will also trigger the multivibrator 118 of the timing and control network 20 to reinitiate the timing of the analysis period, to reset the display 34, and to reset the integrator 30 to begin the analysis anew.

With reference now to FIG. 4 where the voltage switch 74 of FIG. 3 is illustrated in greater detail, the inverted signal from the false output terminal of the flip-flop 66 is applied through the input terminal 78 and a resistor 150 to the base electrode of a grounded emitter NPN transistor Q1. The base electrode of the transistor Q1 is isolated from ground potential by a resistor 152 and the collector electrode is connected through a voltage divider comprising resistors 154 and 156 to a 12 volt source of positive potential. The resistor 154-156 junction is directly connected to the base electrode of a PNP transistor Q2, the emitter electrode of which is directly connected to the 12 volt source of positive potential and the collector electrode of which is grounded through a voltage divider network comprising resistors 158 and 160. The resistor 158-160 junction is directly connected to the output terminal 80 of the voltage switch 74.

The output signal from the multivibrator 68 of FIG. 3 is applied through the input terminal 72 and a resistor 162 to the base electrode of a grounded emitter NPN transistor Q3. The base electrode of the transistor Q3 is isolated from ground potential by a resistor 164 and the collector electrode thereof is connected to a positive source of 12 volt potential through a voltage divider comprising resistors 166 and 168. The resistor 168-168 junction is directly connected to the base electrode of a PNP transistor Q4. The emitter electrode of the transistor Q4 is directly connected to the 12 volt source of positive potential and the collector electrode thereof is connected to a negative 12 volt source through a voltage divider network comprising resistors 170 and 172. The resistor 170-resistor 172 junction is directly connected to the base electrode of an NPN transistor Q5. The emitter electrode of the transistor Q is directly connected to a negative source of 12 volt potential and the collector electrode is connected to the resistor 158-160 junction which serves as the output terminal 80 of the voltage switch 74.

In operation, the application of a positive input signal on the input terminal 78 effects the saturation of the transistor Q1 to provide a negative going signal on the base electrode on the transistor Q2 which saturates in response thereto to apply the positive 12 volt potential across the resistors 158 and 160. The ratio of the values of the resistors 158 and 160 is conveniently 5 to 1 so that a positive 2 volt potential will appear on the output terminal 80 of the voltage switch 74 from the positive 12 volt source.

Similarly, the application of a positive signal from the multivibrator 68 on the input terminal 72 will effect the saturation of the transistor Q-3 to provide a negative going signal on the base electrode of the transistor Q-4 which saturates in response thereto to apply the positive 12 volt potential across resistors 170 and 172. This positive going signal on the base electrode of the transistor Q-5 effects the saturation thereof to apply the negative 12 volt source across the resistors 160 and 161. The ratio of the resistors 161 and 160 is desirably 2 to 1 so that a negative 4 volts will appear on the output terminal 80 of the voltage switch 74.

Since the application of positive signals on the input terminals 78 and 72 are mutually exclusive in that the multivibrator 68 resets the flip-flop 66, the output signal on the terminal 80 of the voltage switch 74 is either a positive 2 volts or a negative 4 volts. These voltages are reflected in the slope and the direction of the waveform illustrated in FIG. 2G as the output signal from the integrator 30 of FIGS. 1 and 3.

Figure 5:
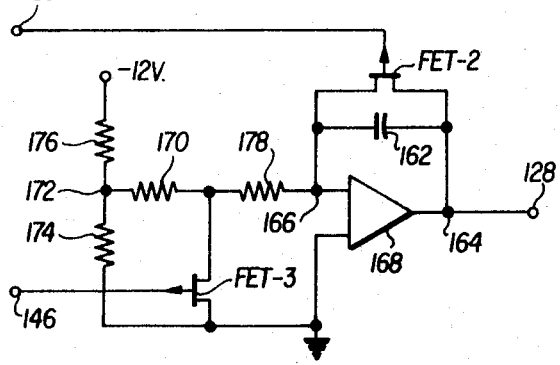
FIG. 5 is a schematic circuit diagram of the ramp generator of FIG. 3.

With reference now to FIG. 5 where the timing network 26 is illustrated in greater detail, the input terminal 125 is connected to the gate electrode of a field effect transistor FET-2 which is connected in parallel with a capacitor 162 to provide a feedback path from the output terminal 164 to the input terminal 166 of a conventional operational amplifier 168. The output terminal 146 of the OR gate 142 of FIG. 3 is connected to the gate electrode of a field effect transistor FET-3. The source electrode of the transistor FET-3 is grounded and the drain electrode is connected through a resistor 170 to the junction 172 of resistors 174 and 176 which form a voltage divider network between a negative source of 12 volt potential and ground. The drain electrode of the transistor FET-3 is also connected through a resistor 178 to the input terminal 166 of the amplifier 168.

In operation, the triggering of the multivibrator 118 of FIG. 3 provides a negative going signal on the gate electrode of the transistor FET-2 which effects the conduction thereof to discharge the capacitor 162 resetting the timing network. The output signal from the multivibrator 118 is desirably of short time duration and the subsequent positive going signal drives the transistor FET-2 into cut off thereby connecting the capacitor 162 between the output terminal 164 and the input terminal 166 of the amplifier 168 to effect the integration of the signal applied to the input terminal 166. The signal which appears on the output terminal 128 of the ramp generator 126 is thus a positive going ramp initiated by the triggering of the multivibrator 118.

The triggering of the multivibrator 118 sets the flip-flop 120 to remove the analysis complete indication and to remove one possible source of a positive signal on the input terminal 146. However, the resetting of the flip-flop 120 reapplies a positive signal from the false output terminal thereof through the OR gate 142 to the gate electrode of the transistor FET-3 to drive the transistors into cutoff. When the transistor FET-3 stops conducting, the input terminal 166 is connected through the resistors 178, 180 and 176 to the negative source of 12 volt potential to apply a negative input signal to the amplifier 168 to generate the timing ramp voltage. The same result may, of course, be achieved by an application of a positive signal from the detector 104 of the 60 Hz. detector 24 to the input terminal 144 of the OR gate 142.

In the absence of a signal at the input terminal 146, the transistor FET-3 conducts connecting the negative 12 volt source to ground through the resistors 176 and 170 and the transistor FET-3 thereby removing the input signal from the terminal 166 of the amplifier 168 and providing a hold for the timing operation.

While not illustrated, it should be noted that a suitable conventional voltage level convertor may be required at the gate electrodes of the transistor FET-1, FET-2 and FET-3 to insure compatability of the logic circuitry with the operating characteristics of the field effect transistors. Where, for example, the logic is positive as described to provide 0 and Hz volt voltage levels, a converter may be necessary to provide the −12 and 0 volt voltage levels normally associated with negative channel field effect transistors.

ADVANTAGES AND SCOPE OF THE INVENTION

By the utilization of the unique method and apparatus of the present invention, the non-repetitive and low voltage electrical activity of the brain may be routinely evaluated by the general practitioner or internist without the expertise of a qualified neurologist. The present invention thus provides for the automatic analysis of the EEG waveform accurately and rapidly and has enormous potential in the routine testing of the natural population for the detection of unknown brain disorders. Immediate display is provided indicating which specific area of the brain may be suspect through selection of the input leads from conventional electrodes conventionally placed on the head of a patient. The present invention has application in emergency clinics, physician offices, multiphasic screening centers, athletic fields and the like where the apparatus is operated by apramedical personnel.

The present invention may thus be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of evaluating EEG signals comprising the steps of:
   a. detecting to be evaluated an EEG signal variable in both amplitude and frequency;
   g. generating a first series of pulses related in occurrence to the frequency of the EEG signal;
   c. generating a second series of constant amplitude pulses related in width to the temporal spacing of the pulses in the first series of pulses;
   d. summing within a predetermined time interval the energy in the pulses in the second series of pulses by adding up to a predetermined maximum the energy in each pulse which exceeds a first predetermined width and by subtracting energy equal to the predetermined maximum for each pulse which exceeds a second predetermined width;
   e. comparing the summed energy with a predetermined reference; and,
   f. indicating the results of the comparison as an evaluation of the EEG signal.

2. The method of claim 1 including the steps of detecting the presence of 60 Hz. components above a predetermined value in the generated EEG signal; and,
   inhibiting both the summing of energy and the running of the predetermined time interval responsively to the detection of the presence of 60 Hz. components above the predetermined value.

3. A method of EEG evaluation comprising the steps of:
   a. detecting an EEG signal to be evaluated;
   b. generating an output signal related in amplitude to the frequency of the EEG signal over a predetermined time interval;
   c. comparing the amplitude of the output signal with a predetermined reference value; and,
   d. indicating the results of the comparison as an evaluation of the EEG signal.

4. The method of claim 3 including the steps of inhibiting the generation of the output signal during the predetermined time interval in response to predetermined frequency components in the EEG signal.

5. The method of claim 4 including the step of extending the duration of the predetermined time interval by an amount equal to the time that the generation of the output signal is inhibited.

6. Apparatus for automatically evaluating an EEG waveform comprising:
   means for providing an EEG waveform to be evaluated, said waveform being variable both in frequency and amplitude;
   means for detecting the frequency of said EEG waveform;
   means for generating a series of pulses having a width related to the detected frequency;
   means for generating an output signal related to the integral of the energy in the pulses in said series of pulses having a width within predetermined limits;
   means for comparing said output signal with a predetermined reference; and,
   means for indicating the results of the comparison as an evaluation of the EEG waveform.

7. The apparatus of claim 6 including means for detecting 60 Hz. signals in said EEG waveform to be evaluated; and, means responsive to said 60 Hz. detecting means for inhibiting the evaluation of said EEG waveform.

8. The apparatus of claim 7 including timing means for limiting the duration of the operation of said output signal generating means, and means responsive to said evaluation inhibiting means for extending the duration of said output signal generating means.

9. Apparatus for automatically evaluating an EEG signal comprising:

electrode means for providing an electrical signal related to brain activity;

means for generating pulses related in energy content to the frequency of said electrical signal;

means for providing an ouput signal related to the integral of the energy in selected ones of said pulses; and, means for comparing said energy related signal with a predetermined reference and for indicating the result of the comparison as an evaluation of the EEG signal.

10. The apparatus of claim 9 wherein the relationship between the energy content of said pulses and the frequency of the EEG signal is inverse.

11. The apparatus of claim 10 wherein said pulses are uniform in amplitude and variable in width.

12. The apparatus of claim 11 wherein said output signal generating means is functionally responsive only to pulses having a width within a predetermined range.

13. The apparatus of claim 12 wherein said pulse width range corresponds to a frequency range of about 3.5 Hz.

14. The apparatus of claim 12 wherein said pulse width frequency range corresponds to frequencies between about 3.5 Hz. and about 7.0 Hz.

15. The apparatus of claim 9 including means for detecting power supply frequency components in said electrical signal, and means responsive to said detecting means for inhibiting said output signal generating means.

16. The apparatus of claim 9 wherein said pulses are uniform in amplitude and variable in width.

17. The apparatus of claim 16 wherein the width of said selected pulses corresponds to frequencies between about 3.5 Hz. and 7.0 Hz.

18. The apparatus of claim 9 wherein said pulse generating means includes:

a time varying signal generator means;

a binary means;

a first threshold detector means responsive to the attainment of a first predetermined value by said time varying signal for setting said binary means to a first condition; and, means responsive to said electrical signal for resetting said binary means to a second condition.

19. The apparatus of claim 18 wherein said output signal generating means includes a second threshold detector means responsive to the attainment of a second predetermined value by said time varying signal for resetting said binary means to a second condition and for reducing the value of said output signal by an amount equal to the energy in the pulse a width related to the time between the setting and resetting of said binary means.

20. The apparatus of claim 19 wherein the width of said selected pulses corresponds to a frequency between about 3.5 Hz. and 7.0 Hz.

21. A method of evaluating an EEG signal comprising the steps of:

a. providing a signal to be evaluated;

b. comparing the EEG signal to be evaluated with a predetermined reference to thereby define a series of time intervals;

c. providing a signal related to the cumulative duration of the time intervals within a predetermined range of time interval durations; and, d. evaluating the cumulative duration of time interval related signals as an evaluation of the signal to be evaluated.

22. The method of claim 21 wherein the predetermined range of time intervals corresponds to a frequency range of about 3.5 Hz.

* * * * *